United States Patent
Arai et al.

(10) Patent No.: US 10,982,585 B2
(45) Date of Patent: Apr. 20, 2021

(54) APPARATUS AND METHOD FOR COOLING ENGINE

(71) Applicant: TOYOTA JIDOSHA KABUSHIKI KAISHA, Toyota (JP)

(72) Inventors: Hirokazu Arai, Toyota (JP); Tetsuma Takeda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/715,900

(22) Filed: Dec. 16, 2019

(65) Prior Publication Data
US 2020/0224582 A1    Jul. 16, 2020

(30) Foreign Application Priority Data
Jan. 15, 2019 (JP) .............................. JP2019-004279

(51) Int. Cl.
| | |
|---|---|
| *F01P 7/14* | (2006.01) |
| *F02N 11/08* | (2006.01) |
| *F01P 5/12* | (2006.01) |
| *F16K 5/06* | (2006.01) |
| *B60W 20/00* | (2016.01) |

(52) U.S. Cl.
CPC ................... *F01P 7/14* (2013.01); *F01P 5/12* (2013.01); *F02N 11/0814* (2013.01); *F16K 5/0652* (2013.01); *B60W 20/00* (2013.01); *F01P 2007/146* (2013.01); *F01P 2060/08* (2013.01)

(58) Field of Classification Search
CPC .......... F01P 7/14; F01P 5/12; F01P 2007/146; F01P 2060/08; F01P 7/16; F02N 11/0814; F16K 5/0652; B60W 20/00
See application file for complete search history.

(56) References Cited

U.S. PATENT DOCUMENTS

| | | | |
|---|---|---|---|
| 2011/0132291 A1 | 6/2011 | Ulrey et al. | |
| 2015/0330351 A1* | 11/2015 | Ragazzi | F02N 19/10 123/552 |
| 2016/0376977 A1* | 12/2016 | Watanabe | F01P 7/167 123/41.08 |
| 2018/0031132 A1 | 2/2018 | Yutani et al. | |
| 2018/0119828 A1 | 5/2018 | Ozeki et al. | |
| 2018/0230891 A1* | 8/2018 | Sato | F01P 3/02 |

FOREIGN PATENT DOCUMENTS

| | | |
|---|---|---|
| JP | 2011-116366 A | 6/2011 |
| JP | 2016-128652 A | 7/2016 |
| JP | 2016-196957 A | 11/2016 |
| JP | 2018-071622 A | 5/2018 |

* cited by examiner

*Primary Examiner* — Syed O Hasan
(74) *Attorney, Agent, or Firm* — Oblon, McClelland, Maier & Neustadt, L.L.P.

(57) ABSTRACT

A valve body of a flow rate control valve includes a fin having a flow formation surface that forms a flow of coolant from a liquid chamber toward a heater port in accordance with rotation of the valve body. An engine cooling apparatus is configured to rotate and drive the valve body alternately in a positive direction and a negative direction from when an engine is automatically stopped to when the engine is automatically restarted so that a heater core is supplied with coolant when the engine is automatically stopped.

8 Claims, 8 Drawing Sheets

APPARATUS AND METHOD FOR COOLING ENGINE

BACKGROUND ART

Field

The following description relates to an apparatus and method for cooling an engine.

Description of Related Art

A known engine cooling apparatus is configured to circulate coolant with a mechanical water pump actuated by the rotation produced by a vehicle engine. The coolant is circulated through a circulation passage. Various types of devices are arranged in the circulation passage to perform heating or cooling by using the coolant as a medium for carrying heat.

A hybrid vehicle or a vehicle that performs stop-and-start (S&S) control automatically stops and restarts the engine in accordance with the traveling situation. Such a vehicle may employ an engine cooling apparatus incorporating a mechanical water pump. In such a case, the water pump is de-actuated when the engine is automatically stopped. This stops the circulation of coolant through the circulation passage. As a result, the devices arranged in the circulation passage will not be supplied with coolant when the engine is not running. For example, a heater core is heated by the coolant to heat the air sent into the passenger compartment. Thus, when the supply of coolant to the heater core is stopped, the passenger compartment cannot be continuously warmed.

In this regard, Japanese Laid-Open Patent Publication No. 2011-116366 describes an engine cooling apparatus incorporating an auxiliary electric water pump in addition to the mechanical water pump. The engine cooling apparatus is configured so that when the engine is automatically stopped, the electric water pump takes place of the de-actuated mechanical water pump so that the heater core is continuously supplied with coolant.

The auxiliary electric water pump is used only under limited situations, that is, when the engine is stopped. Further, the addition of the auxiliary electric water pump increases cost and takes up space. It is thus desirable that coolant be continuously supplied to the heater core and the like when the engine is automatically stopped without using an additional auxiliary electric water pump.

SUMMARY

The present disclosure presents a low-cost apparatus and method for cooling an engine that supplies coolant to a device when automatic stopping of the engine de-actuates a mechanical water pump.

To achieve the above object, a first aspect of the present disclosure is an engine cooling apparatus applied to an engine that performs automatic stopping and automatic restarting in accordance with a traveling situation. The engine cooling apparatus includes a device using coolant as a medium for carrying heat. The device is arranged in a circulation passage of the coolant extending inside the engine. A mechanical water pump is arranged inside the circulation passage and actuated by rotation produced by the engine. A flow rate control valve is arranged inside the circulation passage to regulate a flow rate of the coolant passing through the device. The flow rate control valve includes a housing and a hollow valve body. The housing includes an inlet port into which the coolant flows and a discharge port out of which the coolant is discharged toward the device. The valve body is accommodated and supported rotatably inside the housing and includes a liquid chamber and an opening. The liquid chamber is connected to the inlet port, and the opening connects the liquid chamber and the discharge port when the valve body is located inside the housing at a rotational position that is in a given range. An actuator rotates and drives the valve body. The valve body includes a flow formation surface that forms a flow of the coolant from the liquid chamber toward the discharge port in accordance with rotation of the valve body inside the housing. The engine cooling apparatus further includes a controller configured to drive and control the actuator from when the engine is automatically stopped to when the engine is automatically restarted so that when two rotational positions of the valve body are referred to as a first position and a second position and a rotational position where the opening connects the liquid chamber and the discharge port is included between the first position and the second position, the actuator is repetitively driven so as to alternately rotate the valve body from the first position to the second position and from the second position to the first position.

To achieve the above object, a second aspect of the present disclosure is an engine cooling apparatus applied to an engine that performs automatic stopping and automatic restarting in accordance with a traveling situation. The engine cooling apparatus includes a device using coolant as a medium for carrying heat. The device is arranged in a circulation passage of the coolant extending inside the engine. A mechanical water pump is arranged inside the circulation passage and actuated by rotation produced by the engine. A flow rate control valve is arranged inside the circulation passage to regulate a flow rate of the coolant passing through the device. The flow rate control valve includes a housing and a hollow valve body. The housing includes an inlet port into which the coolant flows and a discharge port out of which the coolant is discharged toward the device. The valve body is accommodated and supported rotatably inside the housing and includes a liquid chamber and an opening. The liquid chamber is connected to the inlet port, and the opening connects the liquid chamber and the discharge port when the valve body is located inside the housing at a rotational position that is in a given range. An actuator rotates and drives the valve body. The valve body includes a flow formation surface that forms a flow of the coolant from the liquid chamber toward the discharge port in accordance with rotation of the valve body inside the housing. The engine cooling apparatus includes a controller including circuity. The circuitry is configured to drive and control the actuator from when the engine is automatically stopped to when the engine is automatically restarted so that when two rotational positions of the valve body are referred to as a first position and a second position and a rotational position where the opening connects the liquid chamber and the discharge port is included between the first position and the second position, the actuator is repetitively driven so as to alternately rotate the valve body from the first position to the second position and from the second position to the first position.

To achieve the above object, a third aspect of the present disclosure includes a method for cooling an engine that performs automatic stopping and automatic restarting in accordance with a traveling situation. The engine includes a device using coolant as a medium for carrying heat. The device is arranged in a circulation passage of the coolant extending inside the engine. A mechanical water pump is arranged inside the circulation passage and actuated by rotation produced by the engine. A flow rate control valve is arranged inside the circulation passage to regulate a flow rate of the coolant passing through the device. The flow rate control valve includes a housing and a hollow valve body. The housing includes an inlet port into which the coolant flows and a discharge port out of which the coolant is discharged toward the device. The valve body is accommodated and supported rotatably inside the housing and includes a liquid chamber and an opening. The liquid chamber is connected to the inlet port, and the opening connects the liquid chamber and the discharge port when the valve body is located inside the housing at a rotational position that is in a given range. An actuator rotates and drives the valve body. The valve body includes a flow formation surface that foil is a flow of the coolant from the liquid chamber toward the discharge port in accordance with rotation of the valve body inside the housing. The method includes driving and controlling the actuator from when the engine is automatically stopped to when the engine is automatically restarted so that when two rotational positions of the valve body are referred to as a first position and a second position and a rotational position where the opening connects the liquid chamber and the discharge port is included between the first position and the second position, the actuator is repetitively driven so as to alternately rotate the valve body from the first position to the second position and from the second position to the first position.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art One embodiment of an engine cooling apparatus will now be described with reference to FIGS. 1 to 8. The engine cooling apparatus in accordance with the present embodiment is applied to a vehicle that performs stop-and-start (S&S) control to automatically stop and restart the engine 10 in accordance with the traveling situation.

Figure 1:
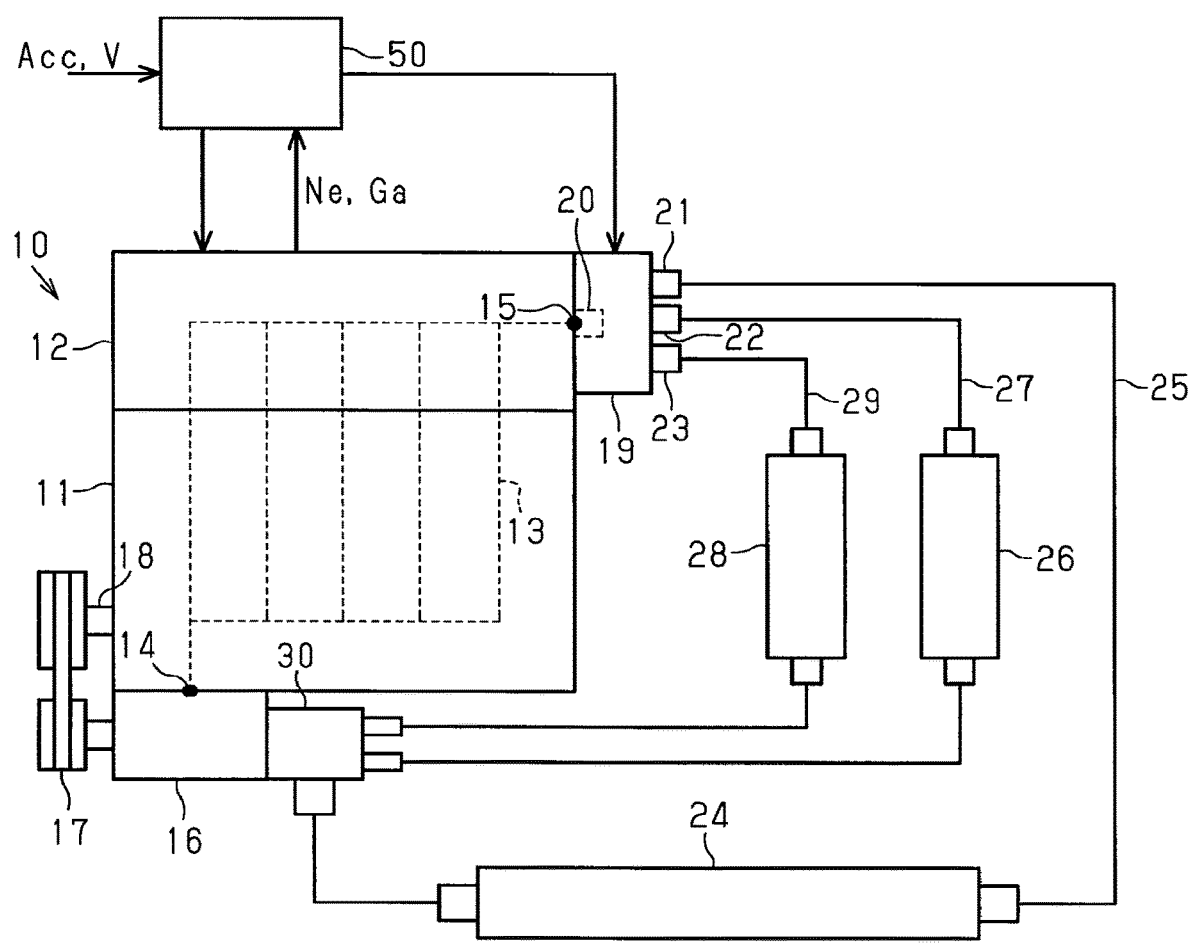
FIG. 1 is a schematic diagram showing the entire structure of one embodiment of an engine cooling apparatus.

As shown in FIG. 1, an engine 10 includes a cylinder block 11 and a cylinder head 12. A water jacket 13 is formed inside the cylinder block 11 and the cylinder head 12. The cylinder block 11 includes an inlet 14 through which coolant flows into the water jacket 13. The cylinder head 12 includes an outlet 15 through which coolant flows out of the water jacket 13. A mechanical water pump 16 is coupled to the cylinder block 11 at a portion where the inlet 14 is located. The water pump 16 is connected by a pulley mechanism 17 to a crankshaft 18 of the engine 10. The water pump 16 is actuated by the rotation produced by the engine 10 to send coolant into the water jacket 13.

A flow rate control valve 19 is coupled to the cylinder head 12 at a portion where the outlet 15 is located. The flow rate control valve 19 includes an inlet port 20 serving as an inlet into which coolant flows from the water jacket 13. The flow rate control valve 19 includes three coolant discharge ports, namely, a radiator port 21, a heater port 22, and an AT port 23. A radiator channel 25 is connected to the radiator port 21. The radiator channel 25 includes a radiator 24 that exchanges heat with ambient air to cool the coolant. A heater channel 27 is connected to the heater port 22. The heater channel 27 includes a heater core 26 that is heated by the coolant to heat the air flowing into the passenger compartment and warm the passenger compartment. An AT channel 29 is connected to the AT port 23. The AT channel 29 includes an ATF warmer 28 that uses the coolant to heat automatic transmission fluid (ATF). The flow rate control valve 19 is configured as a valve that regulates the flow rate of the coolant flowing through each of the radiator channel 25, the heater channel 27, and the AT channel 29. The radiator channel 25, the heater channel 27, and the AT channel 29 merge at an inlet 30 through which coolant flows into the water pump 16.

The radiator 24, the heater core 26, and the ATF warmer 28 are devices using the coolant as a medium for carrying heat. These devices in addition to the water pump 16, which is actuated by the rotation produced by the engine 10, and the flow rate control valve 19, which regulates the flow rate of the coolant passing through the devices, are arranged in a circulation passage of the coolant extending inside the engine 10.

The vehicle includes an electronic control unit 50 that controls the engine 10. The electronic control unit 50 includes a processor and a memory. The processor executes various processes related to engine control, and the memory stores programs and data for engine control. Various types of sensors are arranged in different parts of the vehicle to provide the electronic control unit 50 with various types of signals indicating the operating state of the engine 10 and the traveling situation of the vehicle, such as the engine rotation speed V, the intake air amount Ga, the acceleration pedal depression amount Acc, and the vehicle speed V. The electronic control unit 50 controls the engine 10 based on the signals. Based on the acceleration pedal depression amount Acc and the vehicle speed V, the electronic control unit 50 executes stop-and-start control that automatically stops the engine 10 when the vehicle continues to stay still, such as when stopping at a signal, and automatically restarts the engine 10 when the vehicle is moved. The electronic control unit 50 controls the flow rate control valve 19 and regulates the flow rate of the coolant flowing through each of the radiator channel 25, the heater channel 27, and the AT channel 29.

Figure 2:
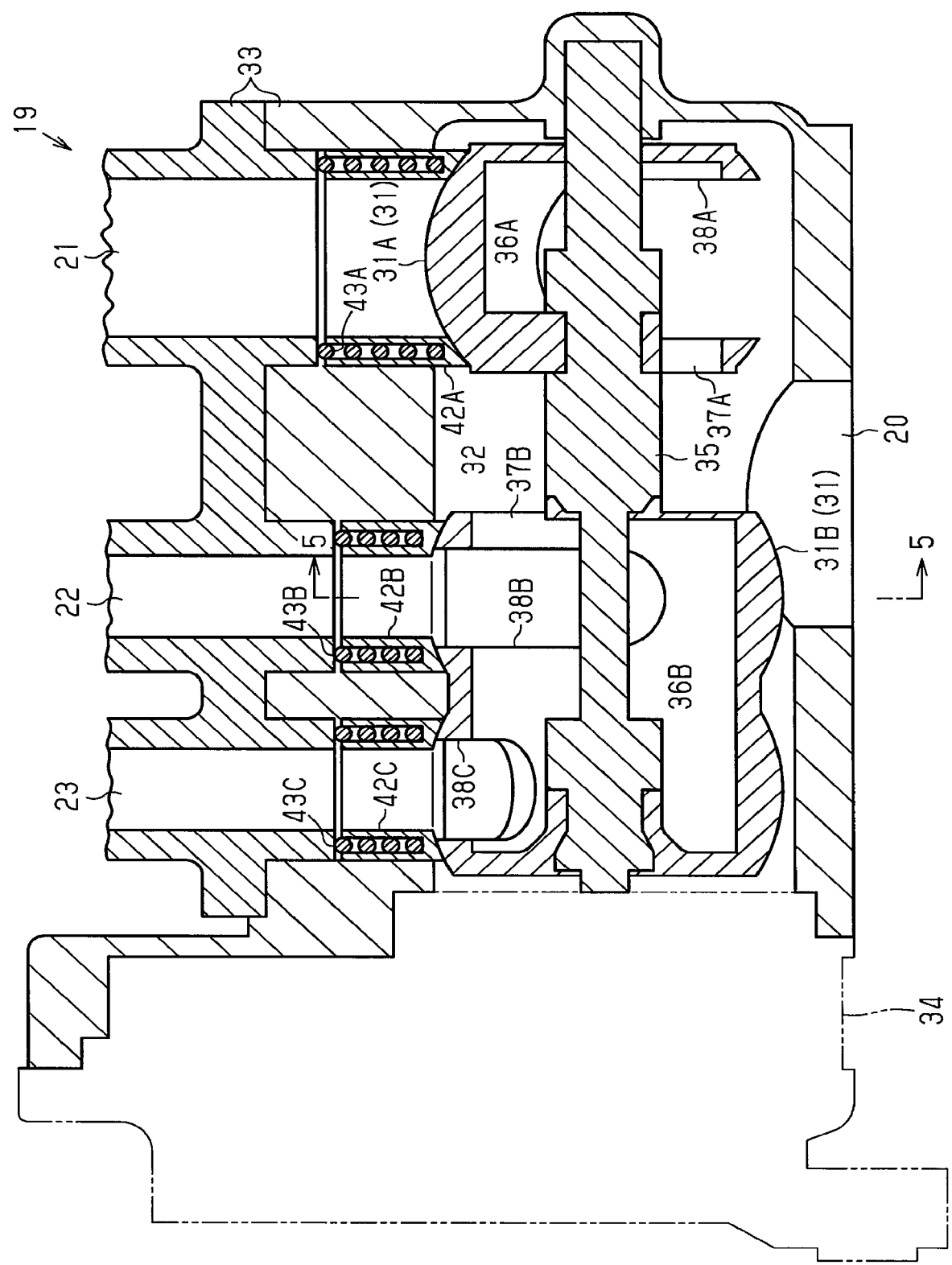
FIG. 2 is a cross-sectional view of a flow rate control valve arranged in the engine cooling apparatus.

As shown in FIG. 2, the flow rate control valve 19 includes a housing 33. The housing 33 includes an accommodation chamber 32 that accommodates a valve body 31. The housing 33 is arranged so that the accommodation chamber 32 is connected to the radiator port 21, the heater port 22, and the AT port 23. An actuator 34 is coupled to the housing 33 to rotate and drive the valve body 31. The valve body 31 is connected to the actuator 34 by a valve rod 35. The valve rod 35 is rotatably supported by the housing 33.

Figure 3:
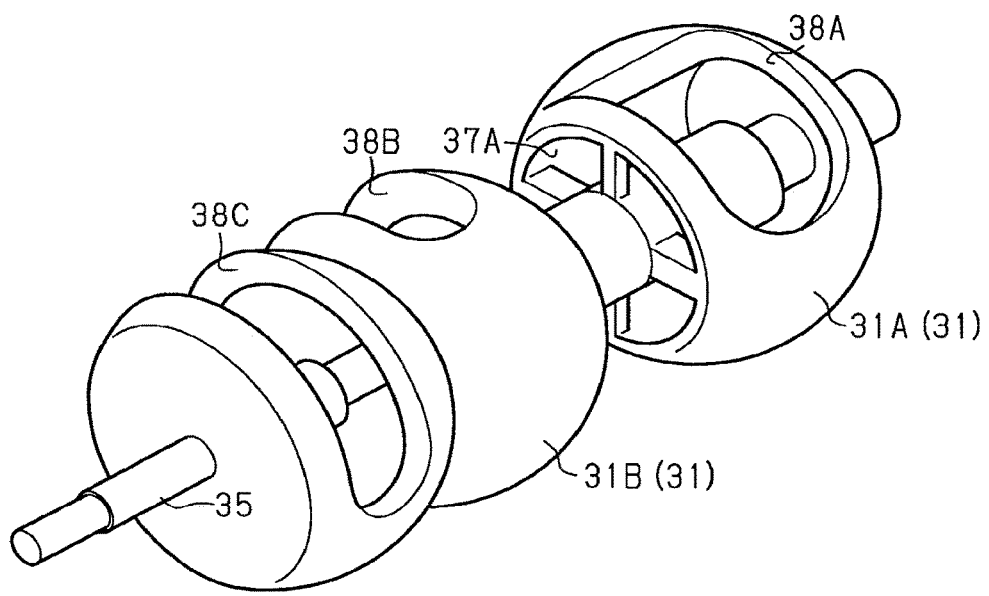
FIG. 3 is a perspective view of a valve body and a valve rod arranged in the flow rate control valve.

As shown in FIG. 3, the valve body 31 is divided into two portions, namely, a radiator portion 31A and a heater/AT portion 31B. The radiator portion 31A and the heater/AT portion 31B are each connected to the valve rod 35 so as to be rotatable integrally with the valve rod 35. The radiator portion 31A is spaced apart from the heater/AT portion 31B. As shown in FIG. 2, the valve body 31 is accommodated in the accommodation chamber 32 so that the gap between the radiator portion 31A and the heater/AT portion 31B is located in an opening of the inlet port 20 that opens in the accommodation chamber 32. Further, the valve body 31 is accommodated in the accommodation chamber 32 so that the radiator portion 31A is located in an opening of the radiator port 21 that opens in the accommodation chamber 32 and so that the heater/AT portion 31B is located in openings of the heater port 22 and the AT port 23 that open in the accommodation chamber 32.

The radiator portion 31A is hollow and includes a liquid chamber 36A The radiator portion 31A has an end including a connection hole 37A that connects the liquid chamber 36A to the outside of the radiator portion 31A. The liquid chamber 36A is constantly connected to the inlet port 20 through the connection hole 37A and the accommodation chamber 32. Further, the radiator portion 31A includes an opening 38A connecting the liquid chamber 36A to the outside of the radiator portion 31A. The opening 38A is elliptic and extends in the rotational direction of the valve body 31. A seal 42A is arranged in the radiator port 21 at a portion open to the accommodation chamber 32. A spring 43A constantly presses the seal 42A against an outer surface of the radiator portion 31A. The seal 42A permits the flow of coolant into the radiator port 21 only through the opening 38A of the radiator portion 31A. The inner side of the opening 38A is constantly connected to the inlet port 20. The inner side of the opening 38A forms part of the liquid chamber 36A of the radiator portion 31A.

In the same manner as the radiator portion 31A, the heater/AT portion 31B is also hollow and includes a liquid chamber 36B. The heater/AT portion 31B has an end including a connection hole 37B that connects the liquid chamber 36B to the outside of the heater/AT portion 31B. The liquid chamber 36B is constantly connected to the inlet port 20 through the connection hole 37B and the accommodation chamber 32. Part of the heater/AT portion 31B that is adjacent to the opening of the heater port 22 includes an opening 38B connecting the liquid chamber 36B to the outside of the heater/AT portion 31B. Part of the heater/AT portion 31B that is adjacent to the opening of the AT port 23 includes an opening 38C connecting the liquid chamber 36B to the outside of the heater/AT portion 31B. The openings 38B and 38C are elliptic and extend in the rotational direction of the valve body 31. A seal 42B is arranged in the heater port 22 at a portion open to the accommodation chamber 32. A spring 43B constantly presses the seal 4211 against an outer surface of the heater/AT portion 31B. The seal 42B permits the flow of coolant into the heater port 22 only through the opening 38B of the heater/AT portion 31B. Further, a seal 42C is arranged in the AT port 23 at a portion open to the accommodation chamber 32. A spring 43C constantly presses the seal 42C against the outer surface of the heater/AT portion 31B. The seal 42C permits the flow of coolant into the AT port 23 only through the opening 38C of the heater/AT portion 31B. The inner sides of the opening 38B and the opening 38C are constantly connected to the inlet port 20. The inner sides of the opening 38B and the opening 38C form part of the liquid chamber 36B of the heater/AT portion 31B.

In the flow rate control valve 19, coolant enters the accommodation chamber 32 from the inlet port 20 and flows through the connection hole 37A into the liquid chamber 36A of the radiator portion 31A. When the opening 38A of the radiator portion 31A is overlapped with the open portion of the accommodation chamber 32 in the radiator port 2 coolant flows from the liquid chamber 36A through the overlapping portion into the radiator port 21. The actuator 34 rotates and drives the valve body 31 in the housing 33, namely, the accommodation chamber 32. The area where the opening 38A of the radiator portion 31A is overlapped with the opening of the radiator port 21, that is, the open area of the radiator port 21, is varied in accordance with the rotational position of the valve body 31.

The coolant entering the accommodation chamber 32 from the inlet port 20 flows through the connection hole 37B into the liquid chamber 36B of the heater/AT portion 31B. When the opening 38B of the heater/AT portion 31B is overlapped with the opening of the heater port 22, coolant flows from the liquid chamber 36B through the overlapping portion into the heater port 22. When the opening 38C of the heater/AT portion 31B is overlapped with the opening of the AT port 23, coolant flows from the liquid chamber 36B through the overlapping portion into the AT port 23. The area where the opening 38B is overlapped with the opening of the heater port 22, that is, the open area of the heater port 22, is varied in accordance with the rotational position of the valve body 31. The area where the opening 38C is overlapped with the opening of the AT port 23, that is, the open area of the AT port 23, is varied in accordance with the rotational position of the valve body 31. In this manner, the flow rate control valve 19 rotates and drives the valve body 31 in the housing 33 to vary the open area of each discharge port. This regulates the flow rate of the coolant flowing through each of the radiator channel 25, the heater channel 27, and the AT channel 29.

A brushed DC motor, which reverses the flow of current to reverse the rotational direction, is used as the actuator 34 of the flow rate control valve 19. In the description hereafter, the rotational direction of the valve body when current flows through the motor in a predetermined direction will be referred to as the positive direction. Further, the rotational direction of the valve body when current flows through the motor in a direction opposite to the predetermined direction will be referred to as the negative direction.

Figure 4:
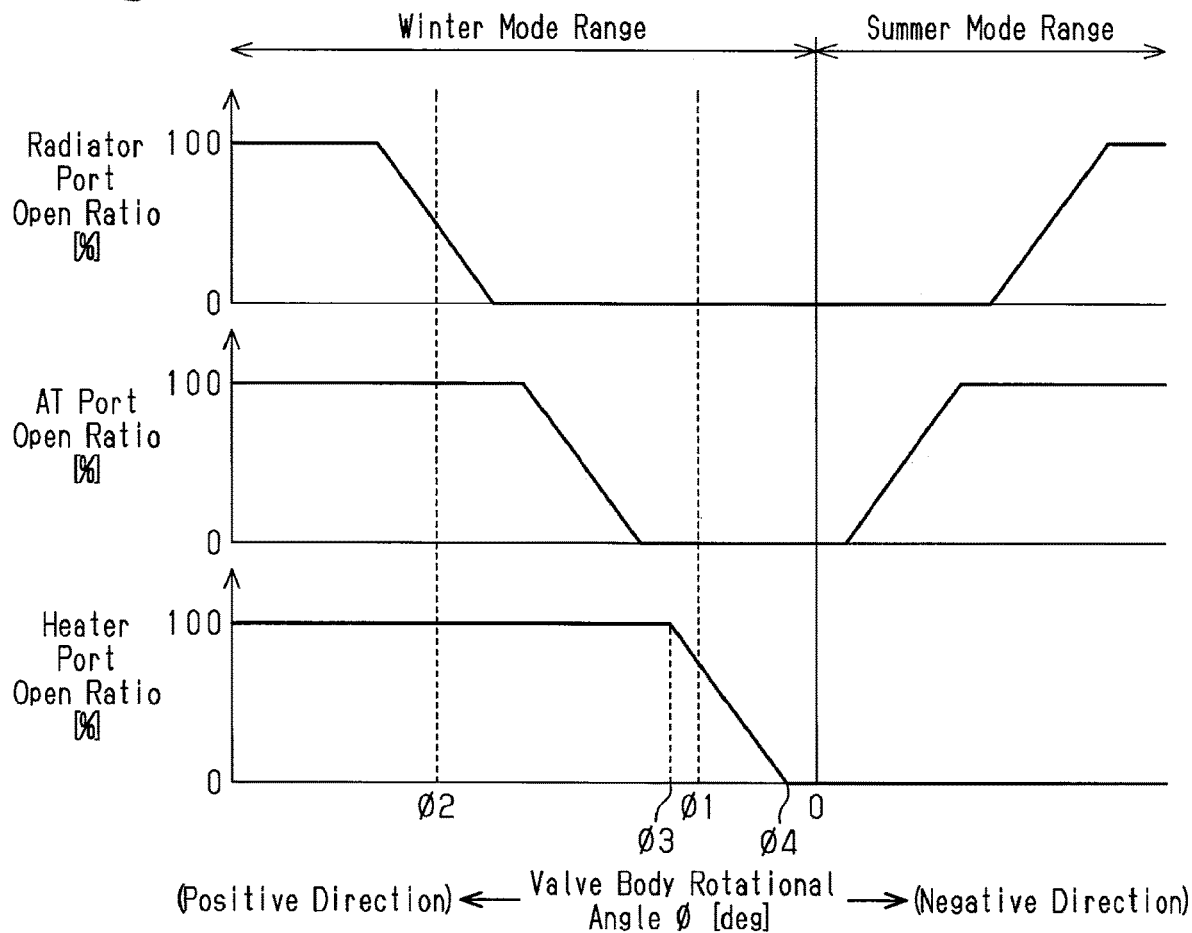
FIG. 4 is a graph showing the relationship of a rotational angle of the valve body and the open ratio of discharge ports in the flow rate control valve.

FIG. 4 is a graph showing the relationship of a rotational angle φ of the valve body 31 and the open ratio of each discharge port. The open ratio refers to the percentage indicating the ratio of the opening area to the maximum value of the opening area in each discharge port. Each discharge port has a different maximum opening area. For example, the maximum opening area of the radiator port 21 is greater than the maximum opening areas of the heater port 22 and the AT port 23. The rotational position of the valve body 31 where the opening areas of the radiator port 21, the heater port 22, and the AT port 23 are all zero, that is, where the open ratios of the discharge ports are all 0%, is where the rotational angle φ is 0°. FIG. 4 shows the rotational position of the valve body 31 based on the rotational angle φ of the valve body 31 in the positive direction or the negative direction from the position where the rotational angle φ is 0°. The range of the rotational position of the valve body 31 in the positive direction from the position where the rotational angle φ is 0° is a range of the rotational angle φ used when warming the passenger compartment (winter mode range). The range of the rotational position of the valve body 31 in the negative direction from the position where the rotational angle φ is 0° is a range of the rotational angle φ used when not wall ling the passenger compartment (summer mode range).

Rotation of the valve body 31 in the positive direction from the position where the rotational angle φ is 0° first starts opening the heater port 22. As the rotational angle φ increases in the positive direction, the open ratio of the heater port 22 gradually increases. The AT port 23 starts opening when the heater port 22 fully opens, that is, when the open ratio of the heater port 22 reaches 100%. As the rotational angle φ further increases in the positive direction, the open ratio of the AT port 23 gradually increases. The radiator port 21 starts opening when the AT port 23 fully opens, that is, when the open ratio of the AT port 23 reaches 100%. As the rotational angle φ further increases in the positive direction, the open ratio of the radiator port 21 gradually increases and ultimately reaches 100%.

Rotation of the valve body 31 in the negative direction from the position where the rotational angle φ is 0° first starts opening the AT port 23. As the rotational angle φ further increases in the negative direction, the open ratio of the AT port 23 gradually increases. The radiator port 21 starts opening when the AT port 23 fully opens, that is, when the open ratio of the AT port 23 reaches 100%. As the rotational angle φ further increases in the negative direction, the open ratio of the radiator port 21 gradually increases and ultimately reaches 100%. In the summer mode range extending in the negative direction from the position where the rotational angle φ is 0°, the heater port 22 is always fully open, that is, the open ratio of the heater port 22 is maintained at 0%.

The electronic control unit 50 sets a target rotational angle φt of the valve body 31 to the rotational angle φ at which the flow rate of coolant in each of the radiator channel 25, the heater channel 27, and the AT port 23 is suitable for the operation state of the engine 10 and the usage state of the heater. Then, the electronic control unit 50 drives and controls the actuator 34 so that the rotational angle φ of the valve body 31 approaches the target rotational angle φt. More specifically, when the target rotational angle φt is a value in the positive direction from the present rotational angle φ of the valve body 31, the actuator 34 is energized to rotate the valve body 31 in the positive direction. Further, when the target rotational angle φt is a value in the negative direction from the present rotational angle φ of the valve body 31, the actuator 34 is energized to rotate the valve body 31 in the negative direction. When the present rotational angle φ of the valve body 31 is matched with the target rotational angle φt, the actuator 34 is de-energized.

In the engine cooling apparatus, the valve body 31 of the flow rate control valve 19 includes a flow formation surface, which will be described later. The electronic control unit 50 executes pump-stop coolant supply control, which will be described later, on the flow rate control valve 19 including the valve body 31. This supplies the heater core 26 with coolant during an automatically stopped period of the engine 10. The automatic stopped period refers to a period from when the engine 10 is automatically stopped to when the engine 10 is automatically restarted.

Flow Formation Surface

Figure 5:
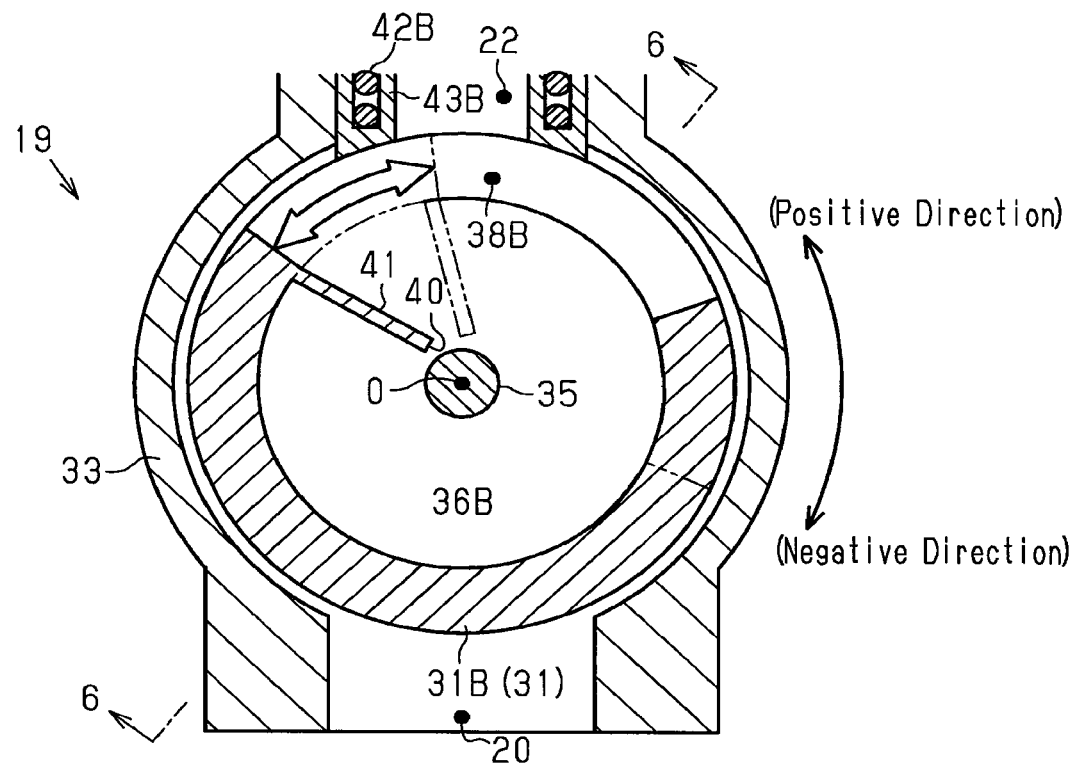
FIG. 5 is a cross-sectional view of the flow rate control valve taken along line 5-5 in FIG. 2.
Figure 6:
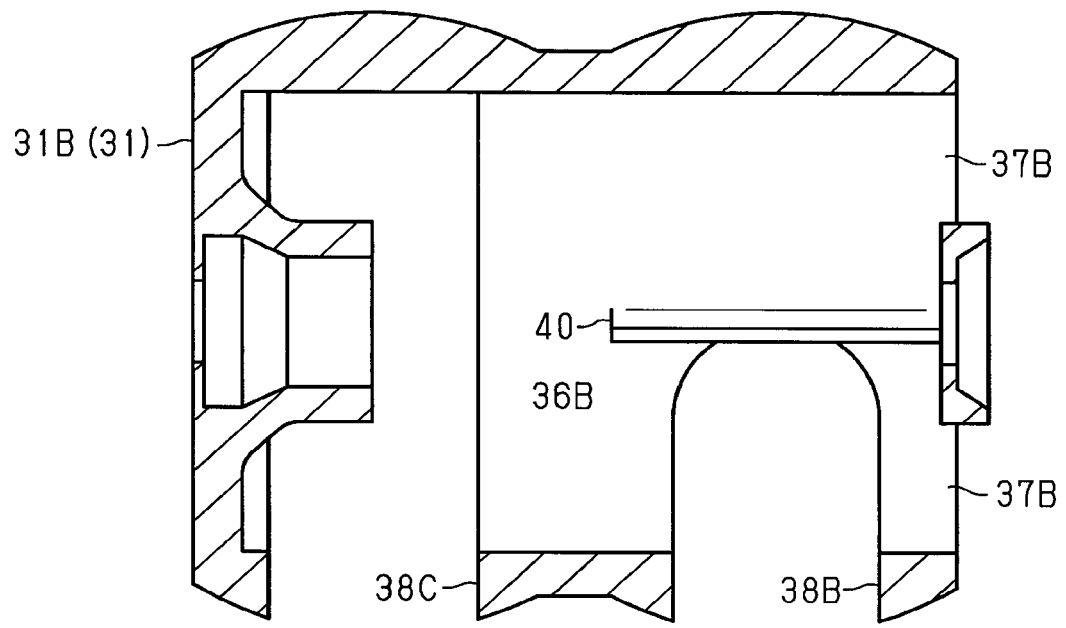
FIG. 6 is a cross-sectional view of the valve body of the flow rate control valve taken along line 6-6 in FIG. 5.
Figure 7:
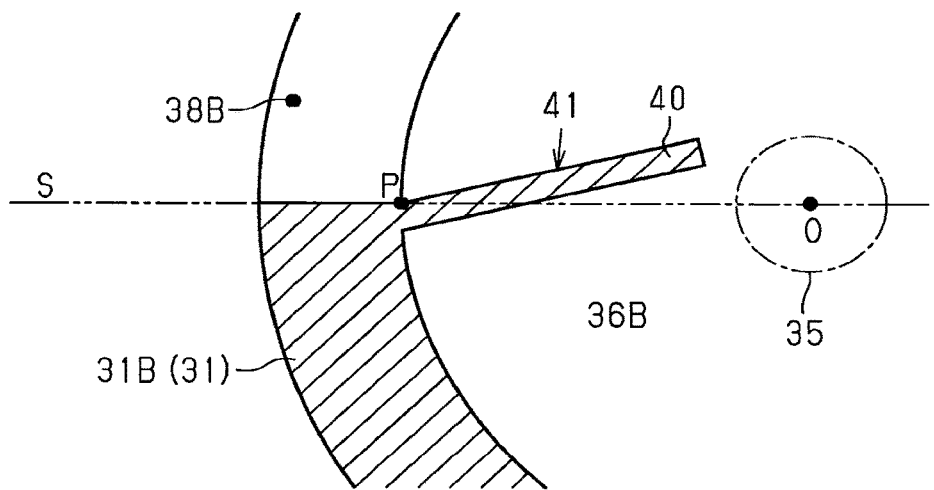
FIG. 7 is an enlarged cross-sectional view showing a fin of the valve body in the flow rate control valve and the periphery of the fin.

As shown in FIGS. 5 and 6, the heater/AT portion 31B includes a fin 40 formed integrally with and extending inward from the inner wall of the heater/AT portion 31B. When the valve body 31 is rotated in the positive direction from the position where the rotational angle φ is 0°, the portion of the opening 38B first overlapped with the opening of the heater port 22 is referred to as the positive end P. Further, the side of the fin 40 directed inward from the inner wall of the heater/AT portion 31B is referred to as the distal side of the fin 40. The side of the fin 40 opposite to the distal side of the fin 40 is referred to as the proximal side of the fin 40. The surface of the fin 40 at the side where the opening 38B is located defines a flow formation surface 41 of the fin 40. The fin 40 is formed so that the proximal end of the flow formation surface 41 coincides with the positive end P. The double-dashed line in FIG. 7 shows plane S extending through the rotation axis O of the valve body 31 (valve rod 35) and the positive end P of the opening 38B. The fin 40 is a flat plate inclined relative to plane S. More specifically, the fin 40 is inclined so that the distance from plane S is greater at the distal end than the proximal end.

Pump-Stop Coolant Supply Control

Figure 8:
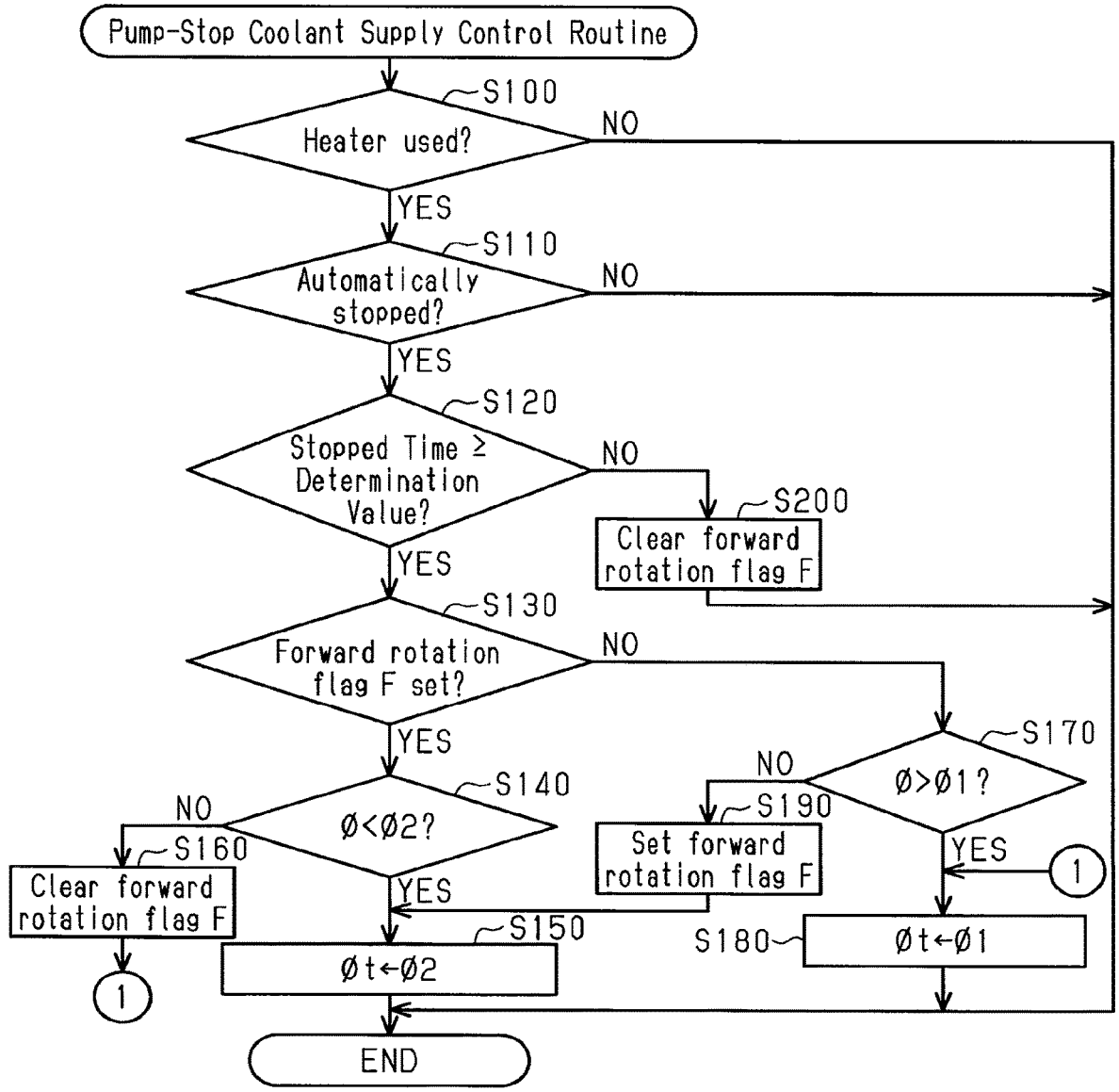
FIG. 8 is a flowchart of a pump-stop coolant supply control routine executed by an electronic control unit serving as a controller in the engine cooling apparatus.

FIG. 8 is a flowchart of the pump-stop coolant supply control routine executed by the electronic control unit 50. When active, the electronic control unit 50 repetitively executes the pump-stop coolant supply control routine in given control cycles. The electronic control unit 50 that executes the pump-stop coolant supply control corresponds to a controller.

When the routine is started, in step S100, the electronic control unit 50 determines whether or not the heater is being used. When the heater is being used (step S100: YES), the electronic control unit 50 proceeds to step S110. When the heater is not being used (step S100: NO), the electronic control unit 50 ends the routine.

In step S110, the electronic control unit 50 determines whether the engine 10 is in an automatically stopped period. When the engine 10 is in an automatically stopped period (step S110: YES), the electronic control unit 50 proceeds to step S120. When the engine 10 is not in an automatically stopped period (step S110: NO), that is, when the engine 10 is running, the electronic control unit 50 ends the routine.

In step S120, the electronic control unit 50 determines whether the elapsed time from when the engine 10 was automatically stopped (hereafter, referred to as the stopped time) is greater than or equal to a given determination value T1. The determination value T1 is set to the time that allows the decrease in the temperature of the air sent into the passenger compartment after the supply of coolant to the heater core 26 is stopped to be maintained within a tolerable range from the aspect of the warming capacity. When the stopped time is greater than or equal to the determination value T1 (step S120: YES), the electronic control unit 50 proceeds to step S130. When the stopped time is less than the determination value T1 (step S120: NO), the electronic control unit 50 proceeds to step S200. In step S200, the electronic control unit 50 clears the forward rotation flag F and then ends the present routine. The forward rotation flag F is used to determine the rotational direction of the valve body 31 when the valve body 31 is rotated and driven in the present routine.

When the stopped time is greater than or equal to the determination value T1, the electronic control unit 50 proceeds to step S130 and determines whether the forward rotation flag F is set. When the forward rotation flag F is set (step S130: YES), the electronic control unit 50 proceeds to step S140. When the forward rotation flag F is not set (step S130: NO), that is, when the forward rotation flag F is cleared, the electronic control unit 50 proceeds to step S170.

When the forward rotation flag F is set and the electronic control unit 50 proceeds to step S140 the electronic control unit 50 determines whether the present rotational angle $\varphi$ of the valve body 31 is a rotational angle $\varphi$ in the negative direction from a given second rotational angle $\varphi2$. As described above, the rotational angle $\varphi$ of the valve body 31 in the flow rate control valve 19 when the passenger compartment is being warmed is controlled within the winter mode range in which the rotational angle $\varphi$ is in a range extending in the positive direction from the position where the rotational angle $\varphi$ is 0°. As shown in FIG. 4, the second rotational angle $\varphi2$ is set to a rotational angle $\varphi$ in the positive direction from a third rotational angle $\varphi3$, which is where the open ratio of the heater port 22 reaches 100% when the valve body 31 is rotated in the positive direction from the rotational position where the rotational angle $\varphi$ is 0°. FIG. 5 shows the valve body 31 in solid lines when the rotational angle $\varphi$ is the second rotational angle $\varphi2$.

As shown in FIG. 8, when the present rotational angle $\varphi$ of the valve body 31 is a rotational angle in the negative direction from the second rotational angle $\varphi2$ (S140: YES), the electronic control unit 50 proceeds to step S150. In step S150, the electronic control unit 50 sets the target rotational angle $\varphi t$ to the second rotational angle $\varphi2$ and then ends the present routine. In this case, the rotational angle $\varphi$ of the valve body 31 is a rotational angle in the negative direction from the second rotational angle $\varphi2$. Thus, the valve body 31 is rotated and driven in the positive direction by setting the target rotational angle $\varphi t$ to the second rotational angle $\varphi2$.

When the present rotational angle $\varphi$ of the valve body 31 is not a rotational angle in the negative direction from the second rotational angle $\varphi2$ (S140: NO), that is, when the present rotational angle $\varphi$ of the valve body 31 is the second rotational angle $\varphi2$ or a rotational angle in the positive direction from the second rotational angle $\varphi2$, the electronic control unit 50 proceeds to step S160. In step S160, the electronic control unit 50 clears the forward rotation flag F and then proceeds to step S180. In step S180, the electronic control unit 50 sets the target rotational angle $\varphi t$ to a given first rotational angle $\varphi1$ and then ends the present routine. As shown in FIG. 4, the first rotational angle $\varphi1$ is set to a rotational angle in the positive direction from a fourth rotational angle $\varphi4$, which is where the heater port 22 starts to open when the valve body 31 is rotated in the positive direction from the rotational position where the rotational angle $\varphi$ is 0°, and in the negative direction from the third rotational angle $\varphi3$, which is where the open ratio of the heater port 22 reaches 100%. That is, the first rotational angle $\varphi1$ is set to a rotational angle in the negative direction from the second rotational angle $\varphi2$. FIG. 5 shows the valve body 31 in double-dashed lines when located at a position where the rotational angle $\varphi$ is the first rotational angle $\varphi1$. When proceeding to step S180, the rotational angle $\varphi$ of the valve body 31 is the second rotational angle $\varphi2$ or a rotational angle in the positive direction from the second rotational angle $\varphi2$. Thus, the target rotational angle $\varphi t$ is set to the first rotational angle $\varphi1$, which is a rotational angle in the negative direction from the second rotational angle $\varphi2$, to rotate and drive the valve body 31 in the negative direction.

When the forward rotation flag F is cleared and the electronic control unit 50 proceeds to step S170, the electronic control unit 50 determines whether the present rotational angle $\varphi$ of the valve body 31 is a rotational angle in the positive direction from the first rotational angle $\varphi1$. When the present rotational angle $\varphi$ of the valve body 31 is a rotational angle in the positive direction from the first rotational angle $\varphi1$ (S170: YES), the electronic control unit 50 proceeds to step S180. In step S180, the electronic control unit 50 sets the target rotational angle $\varphi t$ to the first rotational angle $\varphi1$ and then ends the present routine. In this case, the rotational angle $\varphi$ of the valve body 31 is a rotational angle in the positive direction from the first rotational angle $\varphi1$. Thus, the valve body 31 is rotated and driven in the negative direction by setting the target rotational angle $\varphi t$ to the first rotational angle $\varphi1$. When the present rotational angle $\varphi$ of the valve body 31 is not a rotational angle in the positive direction from the first rotational angle $\varphi1$ (S170: NO), that is, when the present rotational angle $\varphi$ is the first rotational angle $\varphi1$ or a rotational angle in the negative direction from the first rotational angle $\varphi1$, the electronic control unit 50 proceeds to step S190. In step S190, the electronic control unit 50 sets the forward rotation flag F and then proceeds to step S150. In step S150, the electronic control unit 50 sets the target rotational angle $\varphi t$ to the second rotational angle $\varphi2$ and then ends the present routine. In this case, the rotational angle $\varphi$ of the valve body 31 is the first rotational angle $\varphi1$ or a rotational angle in the negative direction from the first rotational angle $\varphi1$. Thus, the valve body 31 is rotated and driven in the positive direction by setting the target rotational angle $\varphi t$ to the second rotational angle $\varphi2$.

The operation and advantages of the engine cooling apparatus will now be described.

In the engine cooling apparatus, the mechanical water pump 16, which is actuated by the rotation produced by the engine 10, is used to circulate coolant through the inside of the engine 10 (water jacket 13). The vehicle to which the engine cooling apparatus is applied performs stop-and-start control on the engine 10. When the automatic stop-and-start control automatically stops the engine 10, that is, in a period from when the engine 10 is automatically stopped to when the engine 10 is automatically restarted, the mechanical water pump 16 also stops operating. When the heater is being used in this state and the supply of coolant to the heater core 26 is stopped, the passenger compartment cannot be continuously warmed.

In this respect, when the pump-stop coolant supply control automatically stops the engine 10 while the heater is being used and the elapsed time from the automatic stopping reaches the determination value T1, the electronic control unit 50 of the engine cooling apparatus starts executing drive control on the actuator 34 as will now be described. When the forward rotation flag F is set and the present rotational angle φ of the valve body 31 is a rotational angle in the negative direction from the second rotational angle φ2, the target rotational angle φt is set to the second rotational angle φ2 to drive and rotate the valve body 31 in the positive direction. Consequently, when the rotational angle φ of the valve body 31 reaches the second rotational angle φ2, the forward rotation flag F is cleared and the target rotational angle φt is changed from the second rotational angle φ2 to the first rotational angle φ1. When the forward rotation flag F is cleared and the present rotational angle φ of the valve body 31 is a rotational angle in the positive direction from the first rotational angle φ1, the target rotational angle φt is set to the first rotational angle φ1 to drive and rotate the valve body 31 in the negative direction. Consequently, when the rotational angle φ of the valve body 31 reaches the first rotational angle φ1, the forward rotation flag F is set and the target rotational angle φt is changed from the first rotational angle φ1 to the second rotational angle φ2. In the description hereafter, the rotational position of the valve body 31 where the rotational angle φ is the first rotational angle φ1 will be referred to as the first position of the valve body 31. Further, the rotational position of the valve body 31 where the rotational angle φ is the second rotational angle φ2 will be referred to as the second position of the valve body 31.

During a period from when the stopped time becomes the determination value T1 to when the engine 10 is automatically restarted, the valve body 31 is repetitively driven so as to be alternately rotated in the positive direction from the first position to the second position and in the negative direction from the second position to the first position. In the description hereafter, the repetitive driving of the valve body 31 for alternate rotation in the positive direction from the first position to the second position and in the negative direction from the second position to the first position will be referred to as the coolant supply drive of the valve body 31.

Figure 9:
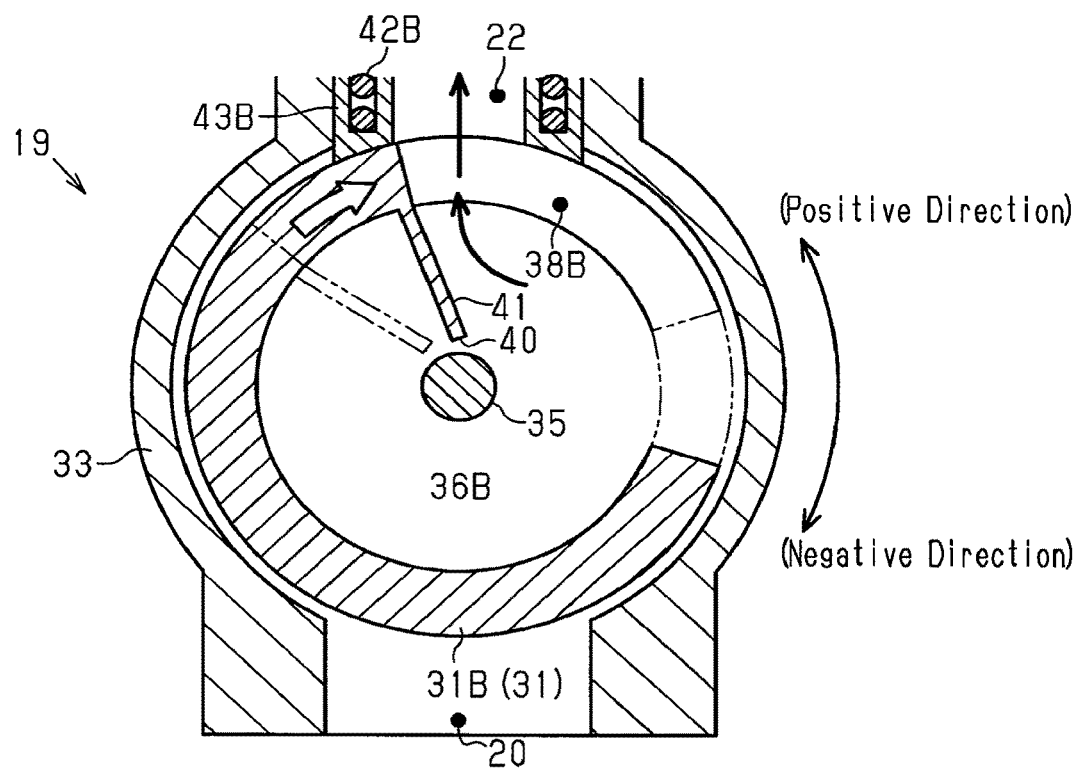
FIG. 9 is a cross-sectional view showing the flow of coolant in accordance with the rotation of the valve body near a heater port in the flow rate control valve of the engine cooling device.

As shown in FIG. 9, the valve body 31 is rotated and driven in the negative direction between the first position and the second position so that the flow formation surface 41 forces the coolant in the liquid chamber 36B of the heater/AT portion 31B of the valve body 31 toward the opening 38B. In this case, the opening 38A is connected to the heater port 22. Thus, the coolant directed toward the opening 38B flows out of the heater port 22 into the heater channel 27. Consequently, even during the pump-stop coolant supply control, the drive control is executed to rotate and drive the valve body 31 in the negative direction from the second position to the first position so that coolant flows out of the heater port 22 of the flow rate control valve 19 into the heater channel 27. When the valve body 31 is rotated to the first position, the valve body 31 is then rotated and driven in the positive direction to the second position. Subsequently, the valve body 31 is rotated and driven again in the negative direction from the second position to the first position so as to form a flow of coolant toward the heater port 22. As a result, the coolant supply drive of the valve body 31 allows the heater core 26 to be supplied with coolant even when automatic stopping of the engine 10 stops the operation of the water pump 16. In the present embodiment, the heater core 26 is supplied with coolant during automatic stopping of the engine 10 by changing the shape of the valve body 31 to include the additional fin 40 forming the flow formation surface 41 and by executing drive control on the actuator 34 that performs coolant supply drive on the valve body 31.

This lowers costs as compared with the conventional engine cooling apparatus that uses the additional auxiliary electric water pump.

The above embodiment may be modified as described below. The above embodiment and the modified examples described below may be combined as long as there is no technical contradiction.

Flow Formation Surface

Figure 10:
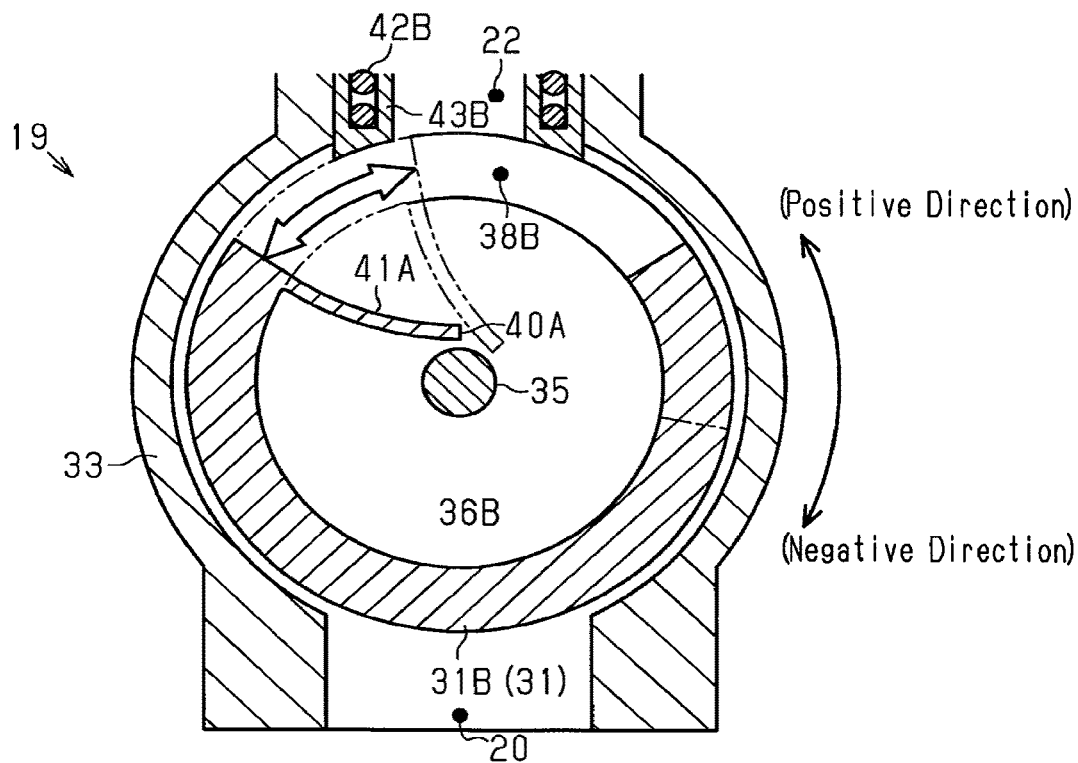
FIG. 10 is a cross-sectional view showing a modified example of a valve body including a fin formed by a curved plate.

In the above embodiment, the valve body 31 includes the fin 40, which is shaped as a flat plate, and the surface of the fin 40 is used as the flow foil cation surface 41 that forms the flow of coolant toward the heater port 22. The flow formation surface is flat but may be curved. For example, as shown in FIG. 10, the valve body 31 may include a fin 40 shaped as a curved plate defining a flow formation surface 41A that is a curved surface. In FIG. 10, the rotational position of the valve body 31 shown in double-dashed lines is the first position, and the rotational position of the valve body 31 shown in solid lines is the second position. In this case, coolant supply drive is also performed on the valve body 31 to supply the heater core 26 with coolant during automatic stopping of the engine 10.

Figure 11:
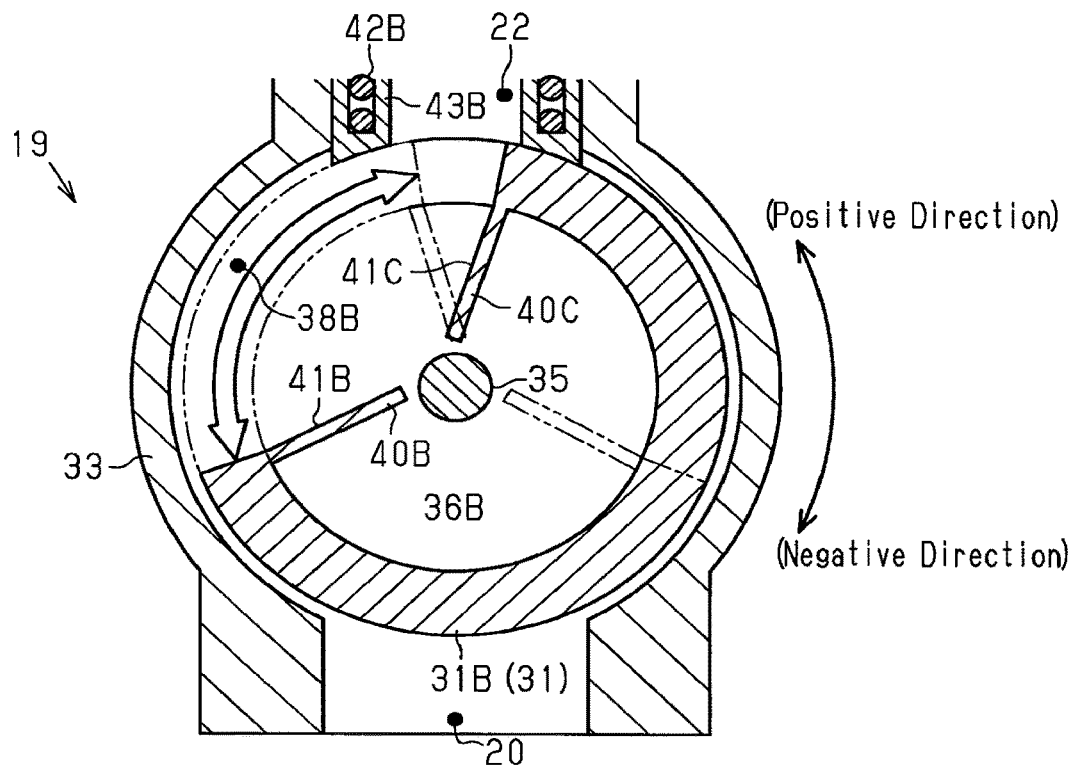
FIG. 11 is a cross-sectional view showing a modified example of a valve body including two fins.

The valve body 31 may include a plurality of fins 40 having surfaces defining flow formation surfaces. For example, FIG. 11 shows a valve body 31 including two fins 40B and 40C arranged so that the opening 38B is located between the two fins 40B and 40C in the rotational direction of the valve body 31. The surfaces of the fins 40B and 40C opposed toward the opening 38B define flow formation surfaces 41B and 41C. In FIG. 11, the rotational position of the valve body 31 shown in double-dashed lines is the first position, and the rotational position of the valve body 31 shown in solid lines is the second position. In this case, coolant supply drive is also performed on the valve body 31 when the pump-stop coolant supply control is executed to supply the heater core 26 with coolant during automatic stopping of the engine 10. The two fins 40B and 40C form the flow of coolant from the liquid chamber 36B toward the heater port 22 when the valve body 31 is rotated and driven from the first position to the second position and when the valve body 31 is rotated from the second position to the first position.

Figure 12:
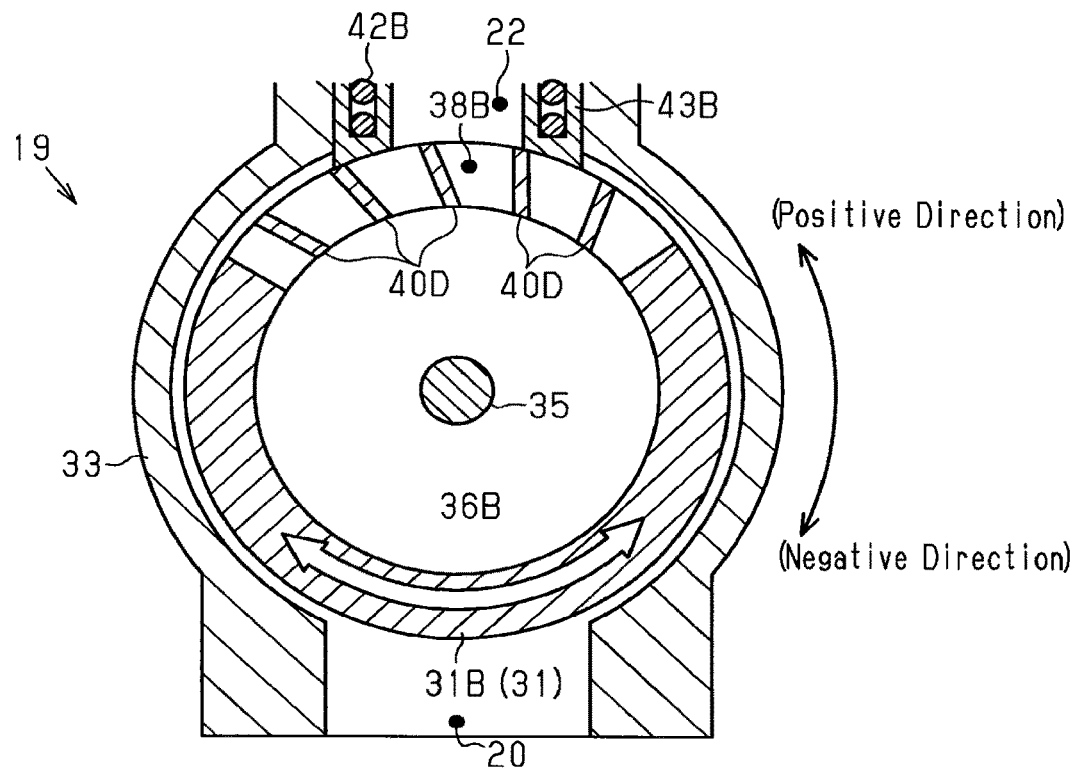
FIG. 12 is a cross-sectional view showing a modified example of a valve body in which fins are arranged in an opening.

A fin including a surface defining a flow formation surface may be arranged in the opening 38B. For example, FIG. 12 shows an example of the valve body 31 including five fins 40D arranged in the opening 38B. In this case, coolant supply drive is also performed on the valve body 31 when the pump-stop coolant supply control is executed to supply the heater core 26 with coolant during automatic stopping of the engine 10.

Figure 13:
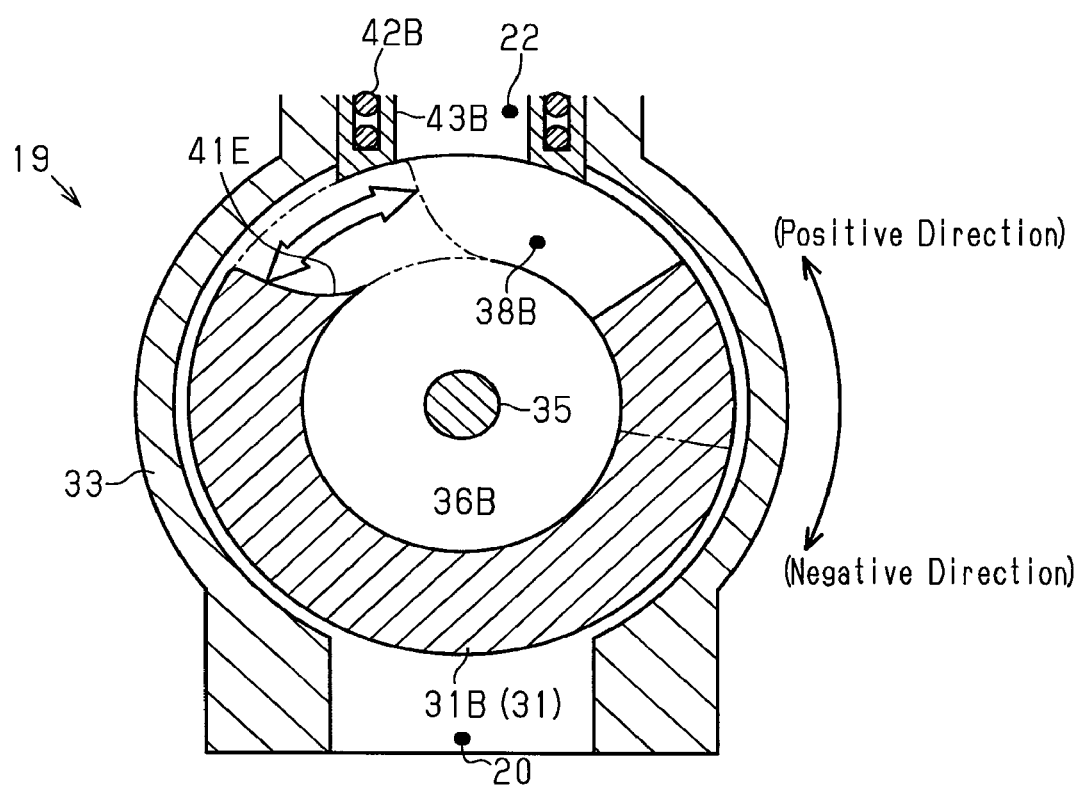
FIG. 13 is a cross-sectional view showing a modified example of a valve body in which part of a side wall surface of an opening forms a flow formation surface.

When the portion of the valve body 31 where the opening 38B is formed (heater/AT portion 31B) is thick enough, part of a side surface of the opening 38 can be used as a flow formation surface. For instance, in the example of the valve body 31 shown in FIG. 13, the surface of one of two end walls defining the opening 38B in the rotational direction of the valve body 31, namely, the surface of the left end wall as viewed in the drawing may be a concave surface defining a flow formation surface 41E. In this case, rotation in the negative direction forms the flow of coolant from the liquid chamber 36B toward the heater port 22. In FIG. 13, the rotational position of the valve body 31 shown in double-dashed lines is the first position, and the rotational position of the valve body 31 shown in solid lines is the second position. In this case, coolant supply drive is performed on the valve body 31 when the pump-stop coolant supply control is executed to supply the heater core 26 with coolant during automatic stopping of the engine 10.

The flow formation surfaces may be shaped differently from the examples given above. The flow formation surface may be defined by any surface that forms a flow of coolant from the liquid chamber 36B toward the heater port 22 in accordance with the rotation of the valve body 31 regardless of shape, size, or location in the valve body 31.

Time for Starting and Ending Coolant Supply Drive on Valve Body 31

In the above embodiment, the determination value T1 used to determine when to start performing coolant supply drive on the valve body 31 during the pump-stop coolant supply control is a fixed value. The determination value T1 may be variably set in accordance with the set temperature of the heater, the temperature of the vehicle, the ambient temperature, the temperature of the coolant in the heater core 26, and the temperature of the air sent to the passenger compartment.

In the above embodiment, the time for starting coolant supply drive on the valve body 31 during the automatically stopped period of the engine 10 is determined based on the elapsed time from when automatic stopping occurs but may be determined based on a parameter such as the temperature of the coolant in the heater core 26 and the temperature of the air sent to the passenger compartment. Further, automatic stopping of the engine 10 and coolant supply drive may be simultaneously started.

In the above embodiment, coolant supply drive is performed on the valve body 31 until the engine 10 is automatically restarted. However, the time for ending the coolant supply drive may be determined based on a parameter such as the duration of the coolant supply drive, the temperature of the coolant in the heater core 26, and the temperature of the air sent to the passenger compartment. More specifically, after coolant supply drive is started, the electronic control unit 50 may determine whether the temperature of the coolant in the heater core 26 has increased to a level allowing for sufficient and continuous warning of the passenger compartment even when the supply of current to the heater core 26 is stopped. Then, the electronic control unit 50 ends the coolant supply drive of the valve body 31 when the coolant temperature has increased to such a level. Further, after ending the coolant supply drive and before automatically restarting the engine 10, the coolant supply drive may be restarted if the temperature of the coolant in the heater core 26 decreases.

Others

The range in which the valve body 31 is rotated and driven when coolant supply drive is performed on the valve body 31 during execution of the pump-stop coolant supply control, that is, the first position and the second position, can be set so that the coolant supply drive effectively supplies coolant to the heater core 26 in accordance with the position and the like of the flow formation surface. Coolant flows into the heater port 22 if the coolant supplying action of the valve body 31 forms a flow of coolant from the liquid chamber 36B toward the heater port 22 with the flow formation surface when the valve body 31 is arranged at a rotational position where the opening 38B connects the liquid chamber 36B and the heater port 22. Thus, the heater core 26 can be supplied with coolant as long as the rotational position resulting in the above state is included in the range in which the valve body 31 is rotated and driven during a coolant supplying action. Thus, even if the heater port 22 is closed at one or both of the first position and the second position, the heater core 26 can be supplied with coolant as long as the rotational position resulting in the above state is included between the first position and the second position.

In the above embodiment, coolant supply drive is performed on the heater core 26 when the pump-stop coolant supply control is executed to supply the heater core 26 with coolant during automatic stopping of the engine 10. However, pump-stop coolant supply control may be performed on a device other than the heater core 26 that is subject to the supply of coolant. In this case, the flow formation surface is defined by a surface forming a flow of coolant toward a discharge port connected to a device that is the subject supplied with coolant. The device other than the heater core 26 may be a radiator, an ATF warmer, an ATF cooler, an EGR cooler, a throttle, a thermostat, or a battery cooler.

In the above embodiment, the flow rate control valve 19 includes three discharge ports. However, the number of discharge ports may be changed in accordance with the configuration of the coolant circulation circuit. In this case, the shape of the valve body 31 may be changed in accordance with the number of the discharge ports.

The engine cooling apparatus of the above embodiment is applied to the engine 10 that undergoes stop-and-start control. An engine mounted on a hybrid vehicle also performs automatic stopping and automatic restarting. The engine cooling apparatus may be applied to such an engine mounted on a hybrid vehicle.

The electronic control unit 50 does not have to perform software processing on all processes it executes. For example, the electronic control unit 50 may include a dedicated hardware circuit (such as application-specific integrated circuit (ASIC)) that performs hardware processing on at least part of the processes executed by software in the present embodiment. That is, the electronic control unit 50 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That s, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An engine cooling apparatus applied to an engine that performs automatic stopping and automatic restarting, the engine cooling apparatus comprising: a device using coolant as a medium for carrying heat, wherein the device is arranged in a circulation passage of the coolant extending inside the engine; a mechanical water pump arranged inside the circulation passage and actuated by rotation produced by the engine; a flow rate control valve arranged inside the circulation passage to regulate a flow rate of the coolant passing through the device, wherein the flow rate control valve includes a housing including an inlet port into which the coolant flows and a discharge port out of which the coolant is discharged toward the device, and a hollow valve body accommodated and supported rotatably inside the housing and including a liquid chamber and an opening, wherein the liquid chamber is connected to the inlet port, and the opening connects the liquid chamber and the discharge port when the valve body is located inside the housing at a rotational position that is in a given range; an actuator that rotates and drives the valve body, wherein the valve body includes a flow formation surface that forms a flow of the coolant from the liquid chamber toward the discharge port in accordance with rotation of the valve body inside the housing; and a controller configured to drive and control the actuator from when the engine is automatically stopped to when the engine is automatically restarted so that when two rotational positions of the valve body are referred to as a first position and a second position and a rotational position where the opening connects the liquid chamber and the discharge port is included between the first position and the second position, the actuator is repetitively driven so as to alternately rotate the valve body from the first position to the second position and from the second position to the first position.

2. The engine cooling apparatus according to claim 1, further comprising a fin extending inward from an inner wall of the valve body, wherein the fin includes a surface defining the flow formation surface.

3. The engine cooling apparatus according to claim 2, wherein
the fin is one of two fins, and
the two fins are arranged so that the opening is located between the two fins in a rotational direction of the valve body.

4. The engine cooling apparatus according to claim 1, comprising a fin that is arranged in the opening, wherein the fin includes a surface defining the flow formation surface.

5. The engine cooling apparatus according to claim 1, wherein the controller is configured to start driving and controlling the actuator if an elapsed time from when the engine is automatically stopped exceeds a given time.

6. The engine cooling apparatus according to claim 1, wherein the device includes a heater core that heats air sent to a passenger compartment when warming air sent to the passenger compartment with heat of the coolant.

7. An engine cooling apparatus applied to an engine that performs automatic stopping and automatic restarting, the engine cooling apparatus comprising: a device using coolant as a medium for carrying heat, wherein the device is arranged in a circulation passage of the coolant extending inside the engine; a mechanical water pump arranged inside the circulation passage and actuated by rotation produced by the engine; a flow rate control valve arranged inside the circulation passage to regulate a flow rate of the coolant passing through the device, wherein the flow rate control valve includes a housing including an inlet port into which the coolant flows and a discharge port out of which the coolant is discharged toward the device, and a hollow valve body accommodated and supported rotatably inside the housing and including a liquid chamber and an opening, wherein the liquid chamber is connected to the inlet port, and the opening connects the liquid chamber and the discharge port when the valve body is located inside the housing at a rotational position that is in a given range; an actuator that rotates and drives the valve body, wherein the valve body includes a flow formation surface that forms a flow of the coolant from the liquid chamber toward the discharge port in accordance with rotation of the valve body inside the housing; and a controller including circuitry, wherein the circuitry is configured to drive and control the actuator from when the engine is automatically stopped to when the engine is automatically restarted so that when two rotational positions of the valve body are referred to as a first position and a second position and a rotational position where the opening connects the liquid chamber and the discharge port is included between the first position and the second position, the actuator is repetitively driven so as to alternately rotate the valve body from the first position to the second position and from the second position to the first position.

8. A method for cooling an engine that performs automatic stopping and automatic restarting, the engine including: a device using coolant as a medium for carrying heat, wherein the device is arranged in a circulation passage of the coolant extending inside the engine; a mechanical water pump arranged inside the circulation passage and actuated by rotation produced by the engine; a flow rate control valve arranged inside the circulation passage to regulate a flow rate of the coolant passing through the device, wherein the flow rate control valve includes a housing including an inlet port into which the coolant flows and a discharge port out of which the coolant is discharged toward the device, and a hollow valve body accommodated and supported rotatably inside the housing and including a liquid chamber and an opening, wherein the liquid chamber is connected to the inlet port, and the opening connects the liquid chamber and the discharge port when the valve body is located inside the housing at a rotational position that is in a given range; and an actuator that rotates and drives the valve body, wherein the valve body includes a flow formation surface that forms a flow of the coolant from the liquid chamber toward the discharge port in accordance with rotation of the valve body inside the housing; the method comprising: driving and controlling the actuator from when the engine is automatically stopped to when the engine is automatically restarted so that when two rotational positions of the valve body are referred to as a first position and a second position and a rotational position where the opening connects the liquid chamber and the discharge port is included between the first position and the second position, the actuator is repetitively driven so as to alternately rotate the valve body from the first position to the second position and from the second position to the first position.

* * * * *